US007004308B2

(12) United States Patent
Parks et al.

(10) Patent No.: US 7,004,308 B2
(45) Date of Patent: Feb. 28, 2006

(54) STEERABLE TELESCOPING CONVEYOR FOR LOADING PARCELS

(75) Inventors: Charlie Parks, Trumann, AR (US);
Eddie Joe Moody, Trumann, AR (US);
Gary Carter, Jonesboro, AR (US);
John Jaynes, Jonesboro, AR (US);
Bobby K. Flippo, Jonesboro, AR (US)

(73) Assignee: Roach Manufacturing Corporation, Trumann, AR (US)

( * ) Notice: Subject to any disclaimer, the term of this patent is extended or adjusted under 35 U.S.C. 154(b) by 0 days.

(21) Appl. No.: 10/863,523

(22) Filed: Jun. 9, 2004

(65) Prior Publication Data

US 2005/0061631 A1 Mar. 24, 2005

Related U.S. Application Data

(60) Provisional application No. 60/505,727, filed on Sep. 24, 2003.

(51) Int. Cl.
*B65G 15/60* (2006.01)

(52) U.S. Cl. ...................... 198/812; 198/588
(58) Field of Classification Search ............... 198/588, 198/594, 595, 812, 861.1
See application file for complete search history.

(56) References Cited

U.S. PATENT DOCUMENTS

| 2,169,890 A | * | 8/1939 | Zink ........................... 198/812 |
| 2,479,823 A | * | 8/1949 | Ernst .......................... 198/588 |
| 4,179,023 A | * | 12/1979 | Hacker et al. ........... 198/861.1 |
| 4,972,940 A | * | 11/1990 | Gleason ....................... 198/588 |
| 5,490,592 A | * | 2/1996 | Best et al. ................... 198/812 |
| 5,685,416 A | * | 11/1997 | Bonnet ........................ 198/812 |
| 6,003,658 A | * | 12/1999 | Best et al. ................... 198/588 |

* cited by examiner

*Primary Examiner*—James R. Bidwell
(74) *Attorney, Agent, or Firm*—Jacobson Holman PLLC

(57) ABSTRACT

An extendable and retractable telescoping conveyor conveys parcels from a supply source to the interior of a freight trailer or other load body. The conveyor includes a pair of elongated conveyor sections which are oriented in overlying relation when in retracted position. The lower conveyor section is extended longitudinally in relation to the upper conveyor section when in an extended position. Each conveyor section includes a declining conveyor structure extending from an elevated infeed end to a lower discharge end with each conveyor structure including a plurality of closely spaced, transversely extending parallel undriven rollers for movement of parcels or other items or materials by gravity throughout the length of the conveyor sections when the conveyor sections are in extended on partially extended relation.

16 Claims, 13 Drawing Sheets

STEERABLE TELESCOPING CONVEYOR FOR LOADING PARCELS

CROSS REFERENCE TO RELATED APPLICATION

This application claims priority from and the benefit of U.S. Provisional Application Ser. No. 60/505,727, filed on Sep. 24, 2003 for: TL230 Extendible Telescoping Conveyor For Loading Parcels Onto Freight Trailer.

BACKGROUND OF THE INVENTION

1. Field of the Invention

The present invention generally relates to an extendable and retractable telescoping conveyor especially useful in, but not limited to, the conveying of parcels from a supply source, such as a storage or distribution facility, into the interior of a freight trailer or other load body, such as a semi-trailer forming part of an over the road delivery system. More specifically, the present invention relates to a telescoping conveyor in which a pair of elongated conveyor sections are oriented in overlying relation when in retracted position, and the lower conveyor section extends longitudinally in relation to the upper conveyor section when in an extended position. Each conveyor section includes a declining conveyor structure extending from an elevated infeed end to a discharge end with each conveyor structure including a plurality of closely spaced, transversely extending parallel undriven rollers for movement of parcels or other items or materials by gravity throughout the length of the conveyor sections when the conveyor sections are in extended or retracted position.

2. Description of the Prior Art

Conveyors of various types are well known for conveying articles or materials from a supply point to a discharge point with such conveyors including declining roller conveyor assemblies which utilize the force of gravity to move parcels or other items from an elevated supply source to a lower delivery point.

Such conveyors frequently are used to convey parcels or other items to a mobile load body that is backed up to a loading dock with the conveyor structures delivering the parcels to the open rearward end of the load body. Thus, the parcels have to be manually moved or otherwise carried to the front end of the load body which may be as long as 50 feet. In addition, the loading dock associated with conveyor systems in a warehouse, storage facility or distribution center also may be of considerable width. Accordingly, fixed length conveyor structures do not function effectively to deliver parcels or other items into the front area of a load body.

SUMMARY OF THE INVENTION

The conveyor of the present invention includes a first upper and a second lower conveyor section which are elongated longitudinally and are telescopically extendable and retractable longitudinally with respect to each other. The upper conveyor section is configured to enable the lower conveyor section to be positioned in underlying relation to the upper conveyor section when the conveyor sections are in retracted position. The lower conveyor section can be longitudinally extended to a position forming a longitudinal extension of the upper conveyor section when the conveyor sections are in extended position. Each conveyor section includes a conveying surface defined by a plurality of transversely extending rotatable rollers oriented in adjacent relation to form a conveying surface for parcels or the like. Movement of the lower conveyor section between retracted and extended positions is provided by a motor driven wheeled support structure at the infeed end of the lower conveyor section which will move the lower conveyor section longitudinally in relation to the upper conveyor section to provide a continuation of the upper conveyor section.

A relatively short transition roller conveyor connects the discharge end of the conveying surface of the conveyor section to the infeed end of the conveying surface of the lower conveyor section to guide parcels or other items from the upper conveyor section to the lower conveyor section. The transition roller conveyor section also includes side guide members supporting a plurality of narrow rollers which rotate about generally vertical axes to assure movement of parcels or other items from the upper conveyor section onto the lower conveyor section. The rollers forming the conveying surfaces are undriven and the conveying sections are oriented in a manner to provide a continuous declining conveying surface from the infeed end of the upper conveyor section to the discharge end of the lower conveyor section. To provide gravity flow of parcels or other articles along the conveying surfaces.

The discharge end of the lower conveyor section includes a steering assembly to enable the discharge end of the conveyor to be located within a load body even though the load body may be slightly misaligned in relation to the conveyor. This steering capability enables parcels or other items to be discharged within the load body and adjacent a forward end thereof to facilitate discharge of parcels adjacent a forward end of the load body to reduce handling of parcels or other items being placed in the load body.

The discharge end of the lower conveyor section also preferably includes a safety disabling assembly to stop the drive motor on the lower conveyor section when contact is made with an obstruction in the load body to eliminate the possibility of injury to personnel that may be located in the load body as well as damage to parcels or other items already stored in the load body.

Typically, the conveyor sections of the present invention may have a length of approximately 30 feet. Hence, the overall length of the conveyor when in retracted position is approximately 30 feet, and the overall length of the conveyor surface when the conveyor is in the extended position is approximately 60 feet. This extension enables the discharge end of the lower conveyor section and in some instances, the upper conveyor section to be extended substantially into the load body toward the forward end of the load body to facilitate loading parcels into the load body starting at the forward end thereof.

The discharge end of the lower conveyor section includes a steering assembly which enables the discharge end of the conveyor to be guided into alignment with a load body which is not in alignment with the conveyor which may occur when the load body is positioned adjacent a loading dock.

Accordingly, it is an object of the present invention to provide a telescoping conveyor including telescopic conveyor sections which can be extended into a load body and retracted with the conveyor sections being withdrawn from the load body.

Another object of the present invention is to provide a conveyor in accordance with the preceding object in which each conveyor section includes a declining conveyor surface formed by undriven rollers for gravity movement of parcels or the like along the conveying surface of each of the conveying sections.

A further object of the present invention is to provide a conveyor structure in which the conveyor sections are oriented in vertically nested relation when in retracted position and in end to end longitudinal relation when in fully extended position.

Still another object of the present invention is to provide a sectional conveyor in which a lower conveyor section is provided with a driven support structure to extend the lower conveyor section and, in some instances, part of the upper conveyor section longitudinally into a load body to facilitate discharge of parcels or other items into a forward end portion of the load body.

Still another object of the present invention is to provide a conveyor structure in accordance with the preceding objects in which the discharge end of the conveyor section that is extended into the load body is provided with a disabling safety structure to terminate extension of the conveyor sections in the event the discharge end of the conveyor section extended into a load body comes into contact with an obstruction.

These together with other objects and advantages that will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The drawings serve to illustrate the present invention but are not intended to be drawn to scale.

DESCRIPTION OF THE PREFERRED EMBODIMENT

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
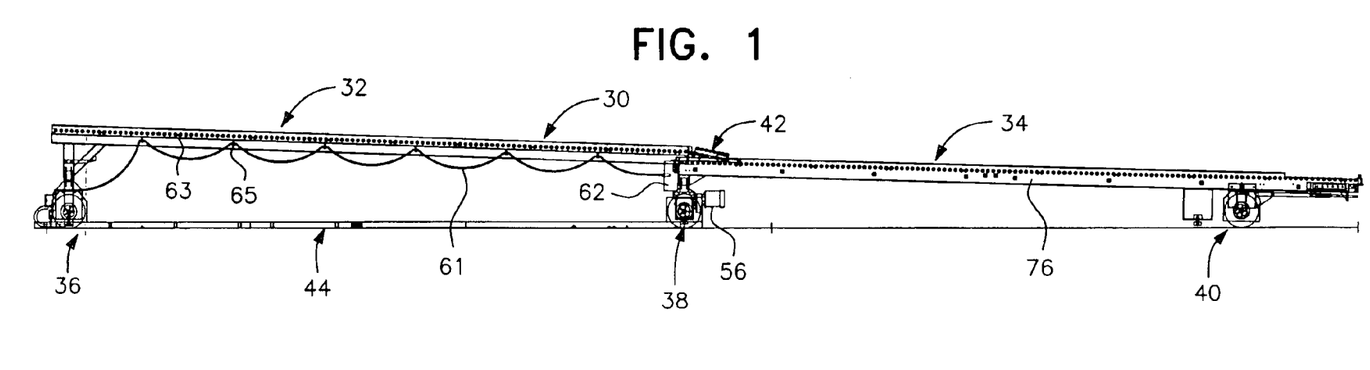
FIG. 1 is a schematic side elevational view of a conveyor in accordance with the present invention illustrating the conveyor in an operative, in-use, extended position in which the longitudinal conveyor sections are substantially in end to end alignment.
Figure 2:
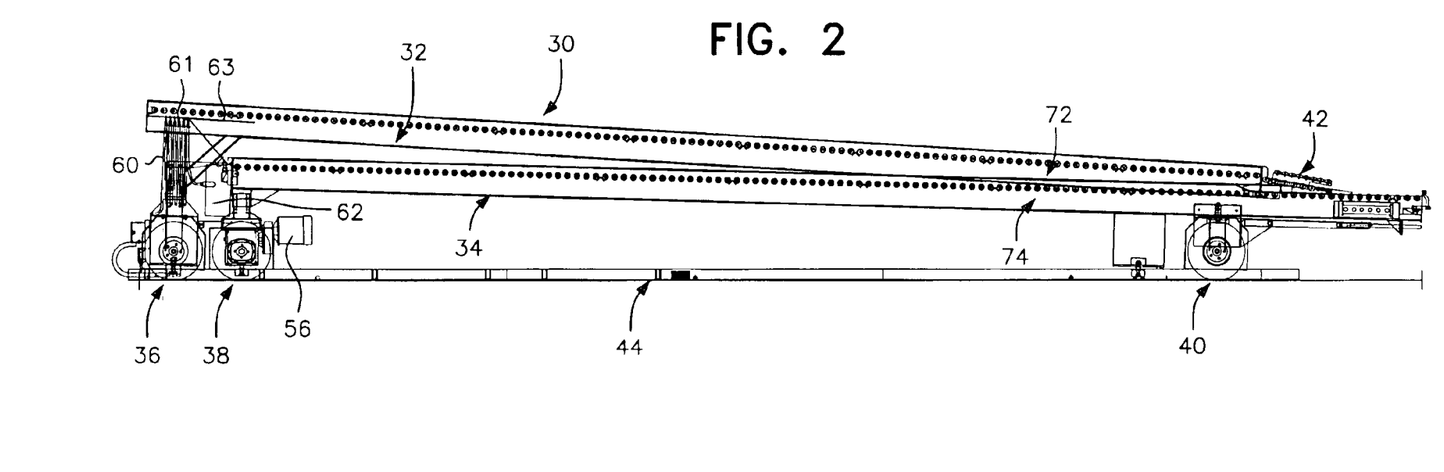
FIG. 2 is a schematic side elevational view of the conveyor of FIG. 1 shown in retracted position in which the lower conveyor section is located in underlying relation to the upper conveyor section.

The extendable and retractable conveyor of the present invention is generally designated by reference numeral 30 and is illustrated in its entirety in FIGS. 1 and 2. FIG. 1 illustrates the conveyor 30 in an extended position, and FIG. 2 illustrates the conveyor 30 in a retracted position. The conveyor 30 includes an upper conveyor section, generally designated by reference numeral 32, and a lower conveyor section, generally designated by reference numeral 34, which extends longitudinally from the upper conveyor section 32 when extended, as illustrated in FIG. 1, and is oriented in generally underlying relation to the conveyor section 32 when retracted, as illustrated in FIG. 2. The upper conveyor section 32 includes a wheeled supporting structure, generally designated by reference numeral 36, at the upper or infeed end thereof. The lower conveyor section 34 includes a motor driven wheeled supporting structure, generally designated by reference numeral 38, at its upper or infeed end and a steerable wheeled supporting structure, generally designated by reference numeral 40, at its discharge end. The discharge end of the upper conveyor section 32 includes a transition conveyor section generally designated by reference numeral 42, connected to the upper conveyor section 32 at one end with the other end in overlying engagement with the infeed end of the lower conveyor section 34 to enable parcels or other items, articles, material being conveyed to move smoothly from the upper conveyor section 32 onto the lower conveyor section 34.

The conveyor 30 constructed in accordance with the present invention is typically supported on a loading dock. The infeed end of the upper conveyor section 32 is then aligned with a conveyor system incorporated into a warehouse, distribution center or the like from which parcels are to be loaded into a load body, such as a box type truck body, a semi-trailer load body or the like, which is backed up to the loading dock. When the conveyor 30 is not in use and in a retracted position, as illustrated in FIG. 2, the discharge end of the lower conveyor section 34 does not extend beyond the loading dock and may be spaced inwardly from the edge of the loading dock to enable access doors which may be on the load body to be opened. When the load body doors are opened and the load body ready to be loaded, the conveyor 30 is extended so that a major portion of the length of the lower conveyor section 34 and possibly some or all of the upper conveyor section 32 extends into the load body. Thus, parcels being conveyed can be delivered to a point close to the forward end of the load body. As loading progresses, the lower conveyor section 34 may be telescoped under the upper conveyor section 32 thereby being moved rearwardly in the load body to continually deliver parcels or other articles to a position adjacent the loading area in the load body to reduce the time and effort normally used in loading parcels into a load body.

Figure 3:
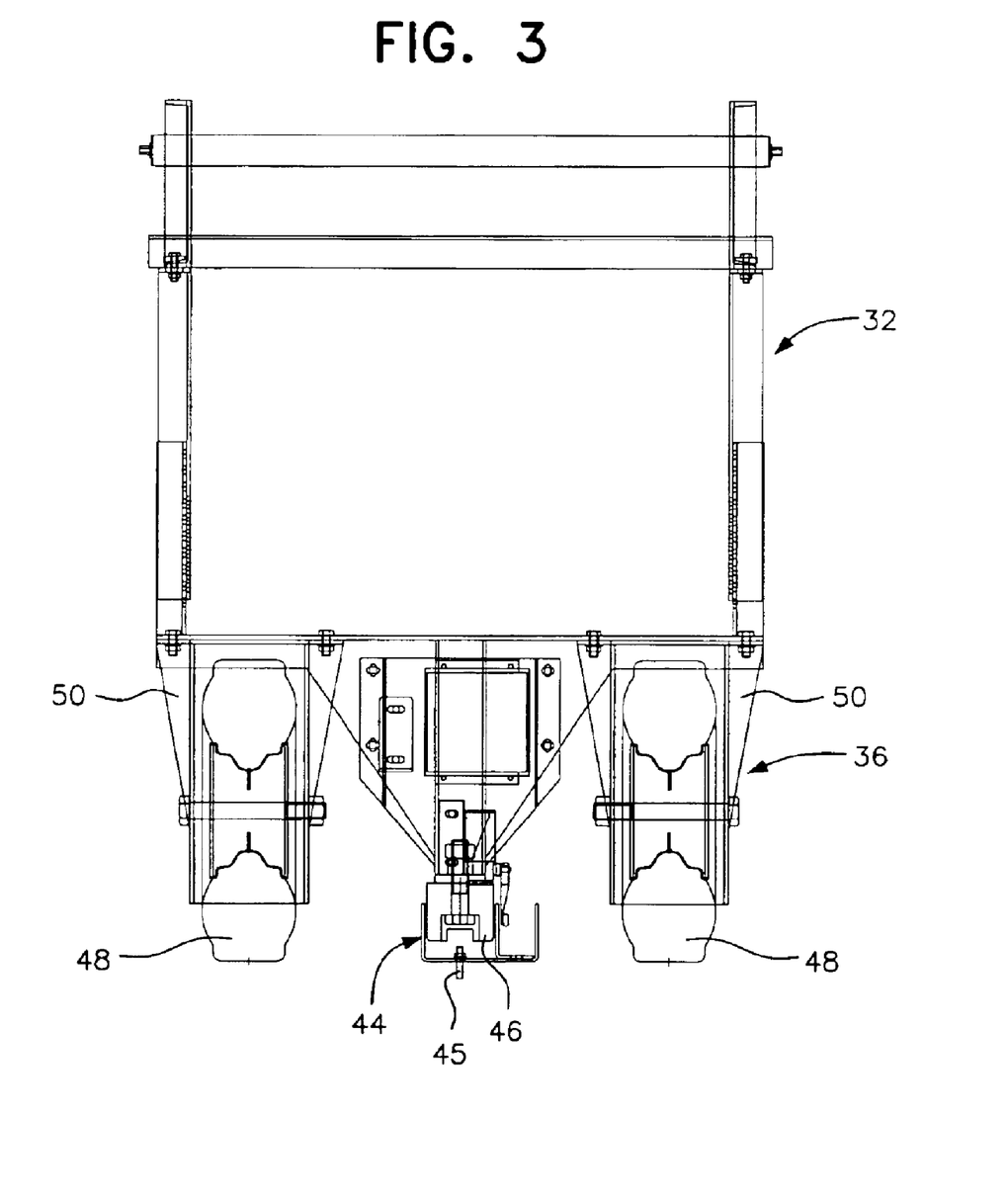
FIG. 3 is an end elevational view of the infeed end of the conveyor of FIG. 1.
Figure 4:
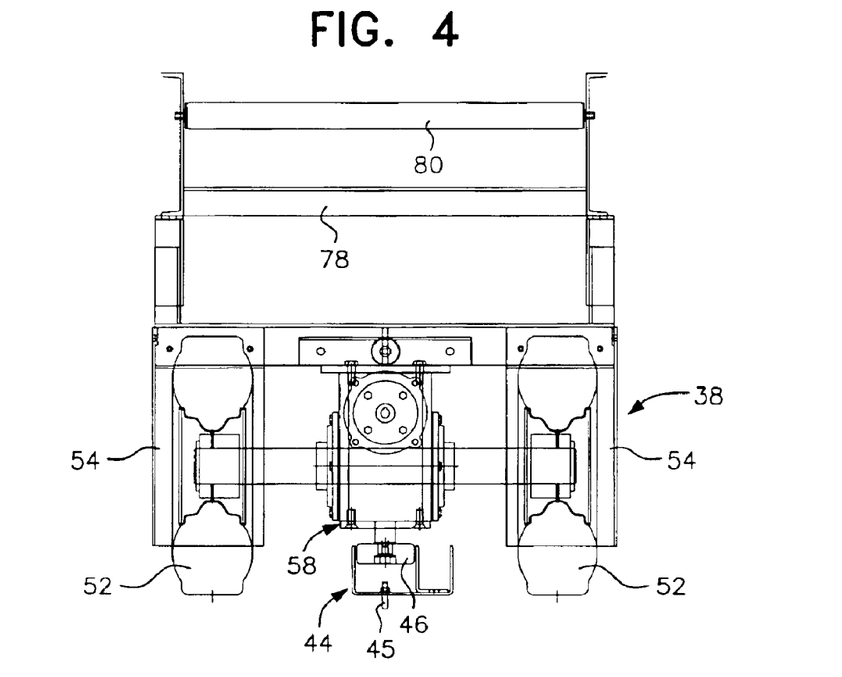
FIG. 4 is an end elevational view illustrating the drive supporting unit for the lower conveyor section of the conveyor of FIG. 1.
Figure 5:
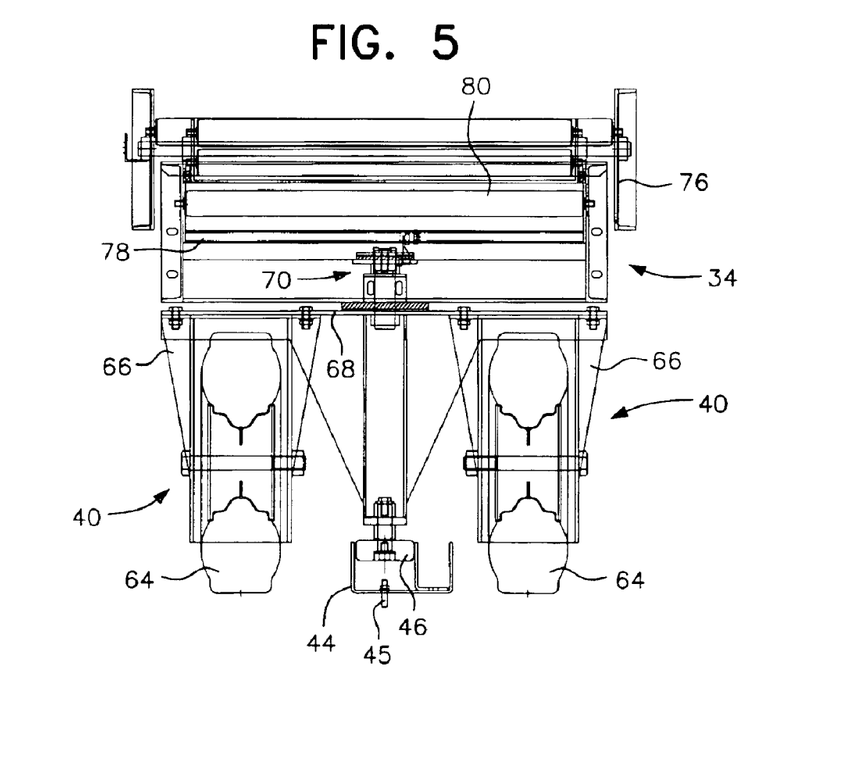
FIG. 5 is an end elevation view of the discharge end of the lower conveyor section of the conveyor of FIG. 1.

A longitudinally elongated guide track, generally designated by reference numeral 44, of an upwardly open channel shaped configuration extends substantially throughout the length of the upper conveyor section 32. The track 44 is attached to the loading dock or floor by bolts 45 or the like and guides movement of the wheeled supporting structures 36 and 38. This arrangement maintains the infeed end of the upper conveyor section 32 in alignment with a point of delivery of parcels or other items to the conveyor 30 and the infeed end of the lower conveyor section 34 in alignment with the discharge end of the upper conveyor section 32 (see FIG. 1). As illustrated in FIGS. 3, 4 and 5, each of the wheeled supporting structures 36, 38 and 40 includes a depending guide pin or roller 46 affixed to the conveyor sections for guiding longitudinal movement of the conveyor sections. As illustrated in FIG. 2, the supporting structure 40 engages the guide channel 44 when the lower conveyor section 34 is in a retracted position. As illustrated in FIG. 1, the steerable wheeled supporting structure 40 exits from the guide track 44 when the lower conveyor section 34 is extended to enable an operator to manually adjust the steerable wheeled assembly 40 in order to adjust for misalignments of the load body with the discharge end of lower conveyor section 34.

As illustrated in FIG. 3, the supporting structure 36 includes a pair of supporting wheels 48 oriented in transverse alignment and supported from the infeed end of the upper conveyor section 32 by a bracket structure 50. As illustrated in FIG. 4, the driven wheeled supporting structure 38 also includes a pair of supporting wheels 52 supported by bracket structures 54. The wheels 52 are driven by a reversible electric motor 56 through a gear box and axle assembly 58 to drive both wheels 52 at the same speed. The driven supporting structure 38 forms a structure for extending and retracting the conveyor section 34. The electric motor 56 is supplied electrical energy through a cable 61 with one end connected to a source of electrical energy and the other end connected to the motor 56 through a junction box 62. The cable 61 is suspended from a tensioned support cable 63 attached at its ends to the upper conveyor section 32 by movable slide rings 65 to allow cable 61 to extend and retract during extension and retraction of the lower conveyor section 34 from a retracted position shown in FIG. 2 to an extended condition shown in FIG. 1. When lower conveyor section 34 retracts, the cable 61 folds into a plurality of vertical folds or loops 60 (see FIG. 2). As illustrated in FIG. 5, the steerable supporting structure 40 also includes a pair of wheels 64 supported by bracket structures 66 and further includes a supporting plate 68 connected to the discharge end of the lower conveyor section 34 through a fifth wheel steerable assembly, generally designated by reference numeral 70.

Each of the conveyor sections 32 and 34 include rigid, longitudinally extending frames 72 and 74 as indicated in FIGS. 1 and 2. Each of the frames includes a pair of side rails 76, such as channel shaped members with outwardly extending top and bottom flanges as illustrated in FIG. 5 with the rails 76 being rigidly interconnected by transverse frame members 78. The frame rails 76 also rotatably journal a plurality of cylindrical rollers 80 which are oriented in spaced parallel relation with the spatial relationship between adjacent rollers being relatively small so that the upper surfaces of the rollers define a conveying surface.

As illustrated in FIGS. 1 and 2, the rollers 80 in upper and lower conveying sections 32 and 34 define a declining conveying surface for gravity flow of parcels along the conveying surfaces by the force of gravity and the weight of the parcels being conveyed causing rotation of the rollers 80 in a well known manner. The transition conveyor section 42 functions to form a continuous conveying surface between the upper conveyor section 32 and the lower conveyor section 34 regardless of the extended or retracted position of the conveyor section 34.

Figure 6:
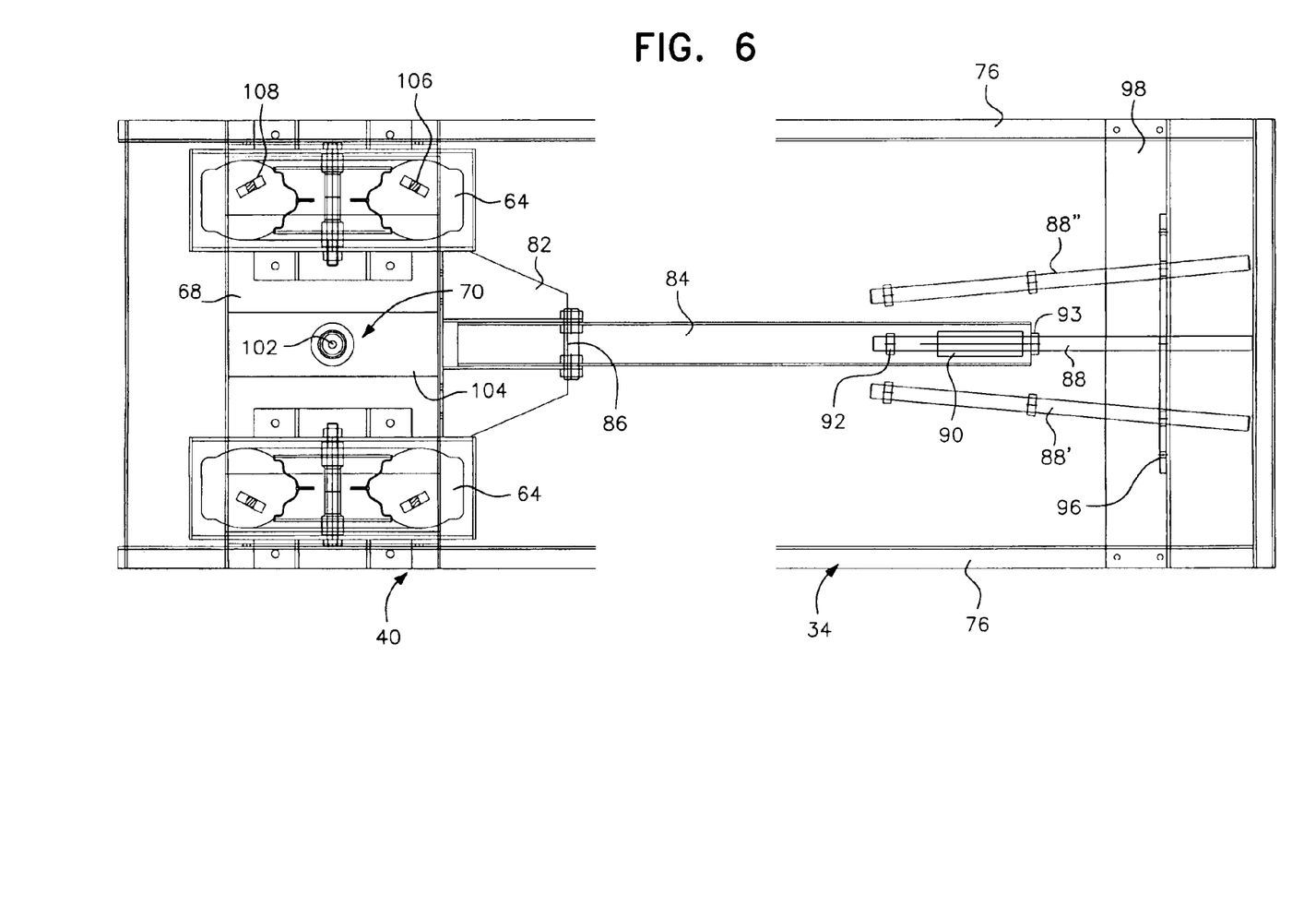
FIG. 6 is a schematic top plan view of the discharge end of the lower conveyor section illustrating positions of the steering assembly in accordance with the present invention.
Figure 7:
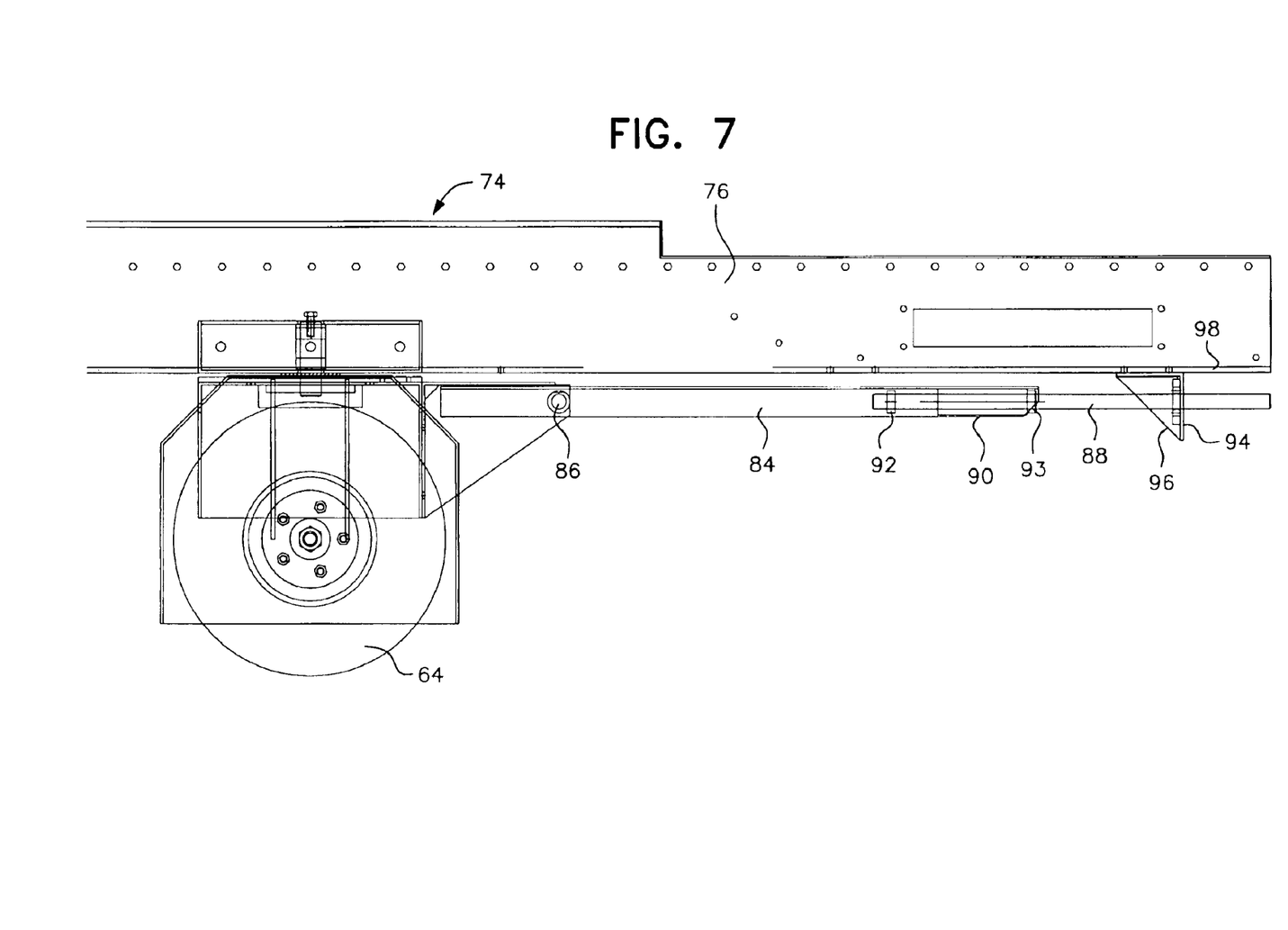
FIG. 7 is a schematic side elevational view of the discharge end of the lower conveyor section illustrating specific details of the steering assembly in accordance with the present invention.

FIGS. 6–10 illustrate additional details of construction of the steerable supporting structure 40 at the discharge end of lower conveyor section 34. The plate 68 forms part of the fifth wheel assembly 70 and includes an extension plate 82 on plate 68 to which a forwardly extending steering tongue 84 is connected by a transverse pivot bolt 86. The forward end of the tongue 84 includes a steering control member 88 in the form of a cylindrical rod or tube that is slidably supported in the end of the tongue 84 by a sleeve type guide 90 attached to the forward end of the tongue 84. The control member 88 includes stop members 92 and 93 which limit the longitudinal movement of the control member 88. The forward end of the control member 88 extends through a latch plate 94 and support member 96 attached to the underside of a transverse plate 98 attached to side frame rails 76. FIG. 7 illustrates the control member 88 in its retracted position with the outer end generally aligned with the end of the side frame rails 76. The guide 90 permits the control member 88 to be extended beyond the frame rails 76 so that it forms a handle that can be manually grasped for pivoting steerable support structure including wheels 64 about the vertical axis formed by the fifth wheel assembly 70.

Figure 10:
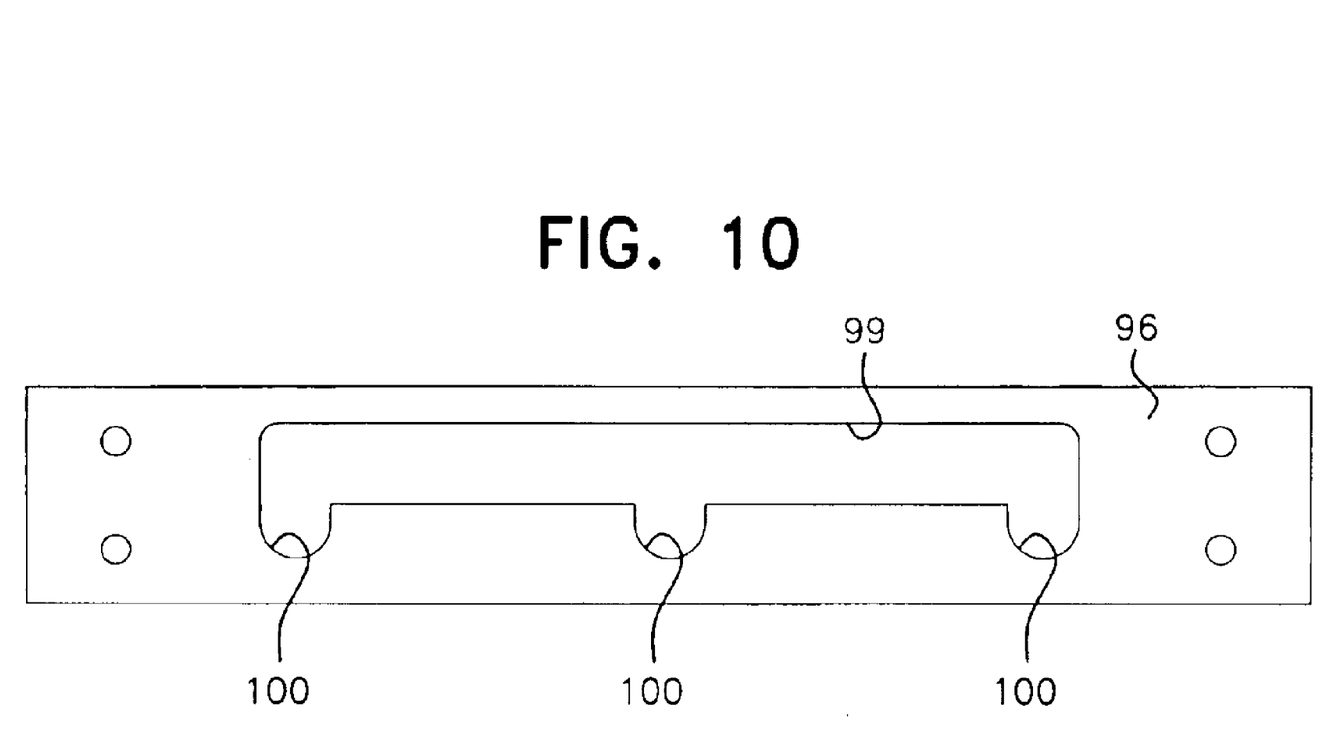
FIG. 10 is an elevational view of the latch device associated with the steering control member at the forward end of the lower conveyor section in accordance with the present invention.

The plate 94 or the support member 96 includes a transversely extending slot 99 as illustrated in FIG. 10 with three notches 100 formed in the bottom of the slot 99 for receiving the control member 88 in a selected notch to position the tongue 84 and control member 88 either in a central position or in one of two angular positions, one on each side of the central position. As illustrated in FIG. 6 and designated by reference numerals 88' and 88", an operator may grasp the control member 88 which forms a handle for the tongue 84 and pivot the supporting wheel structure to either of the angular positions by pivoting the support plate 82 and the wheels mounted thereon about a vertical axis defined by pivot 102 of the fifth wheel assembly 70. The horizontal pivot axis 86 enables the handle end of control member 88 to be elevated and moved into a selected notch 100 in the plate 96 mounted on the depending support plate 94. This allows an operator at the discharge end of the conveyor to adjust the conveyor section 34 and lock the fifth wheel steering assembly 70 either in a straight condition or angled to either side to adjust the discharge point of the lower conveyor section 34 in relation to a vehicle load body by adjusting for minor misalignment of the vehicle body with the conveyor when the vehicle load body is being backed into position against or adjacent the loading dock. As the lower conveyor section 34 is driven forward, it will either pull the upper conveyor section 32 with it or slide beneath the discharge end of the upper conveyor section 32. The pivotal movement of the steerable supporting structure 40, although limited in nature, is permitted because the pin or wheel 46 in the guide track 44 has exited the guide track 44 when the lower conveyor section 34 is extended.

The fifth wheel steering assembly 70 for the wheel structure 40 includes a vertical shaft 103 interconnecting the support plate 68 (for the wheels 64 and wheel support brackets 66) and a plate 104 rigid with the forwardly extending plate 82 to which the forwardly extending tongue 84 is attached. The weight on the discharge end of the conveyor section 34 is supported by a plurality of rollers 106 each of which engages pathway 108 of limited extent in plate 68. This structure allows manual control of the angular position of the wheels structure 40 to enable limited steering movement for the discharge end of the conveyor section 34.

Figure 8:
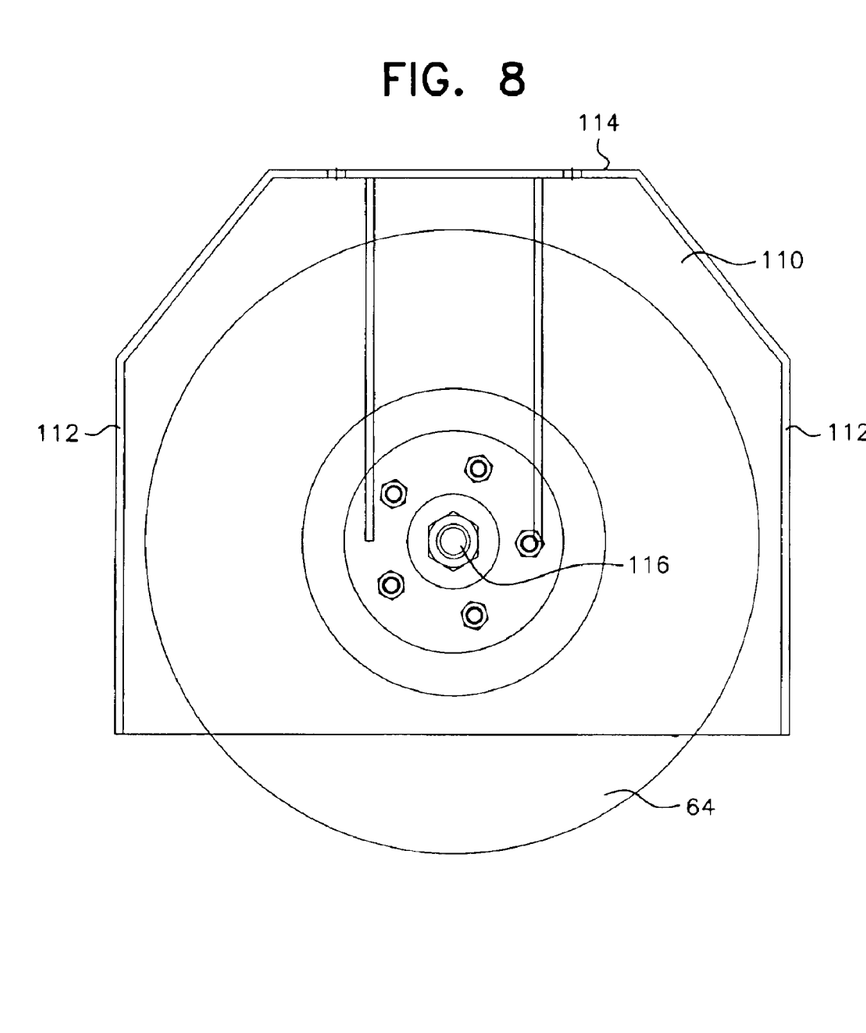
FIG. 8 is a schematic side elevational view of the supporting wheel and wheel mounting bracket for the steering assembly illustrated in FIGS. 6 and 7.
Figure 9:
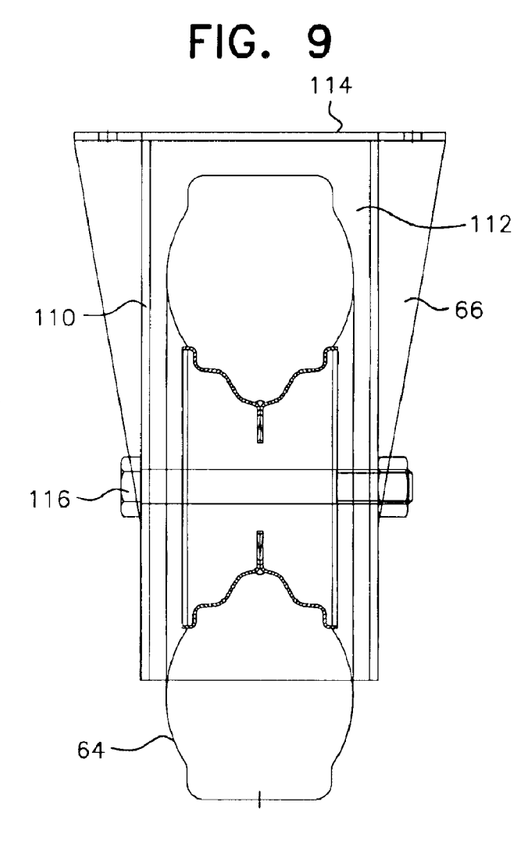
FIG. 9 is an end view of the wheel mounting structure illustrated in FIG. 8.

FIGS. 8 and 9 illustrate details of construction of the support brackets 66 for the wheels 64. Brackets 66 include side plates 110 and forward and rear end plates 112 all of which are interconnected by a top plate 114 to support the wheels for rotation about a central axle 116. This structure substantially encloses the wheels 64 except for a lower portion thereof to reduce the possibility of the wheels 64 coming into contact with an operator steering the discharge end of the conveyor section 34.

Figure 11:
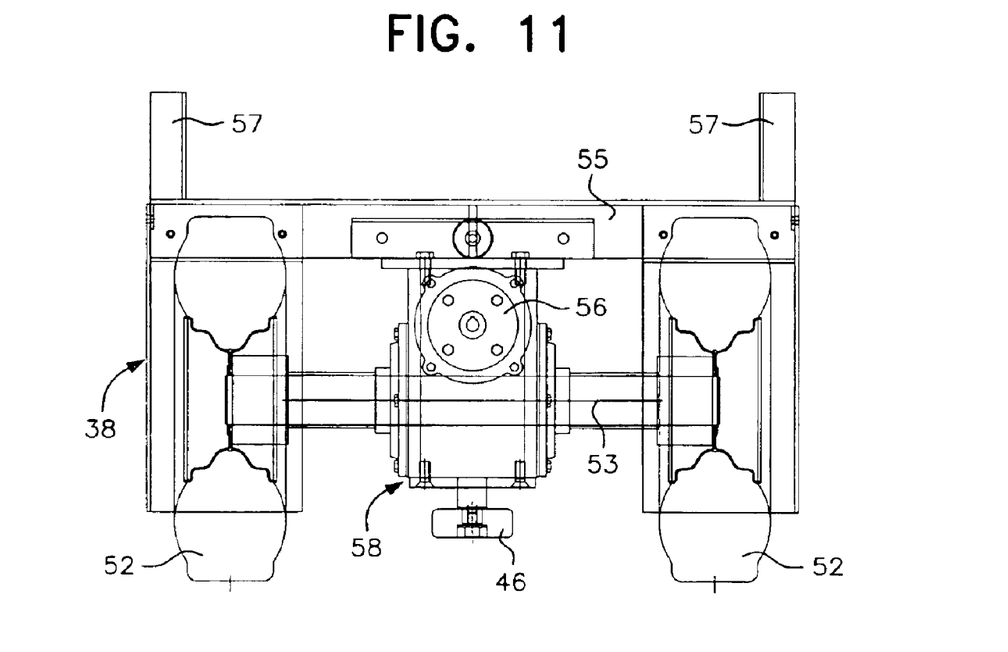
FIG. 11 is an elevational view of the driven wheel support for the infeed end of the lower conveyor section in accordance with the present invention.
Figure 12:
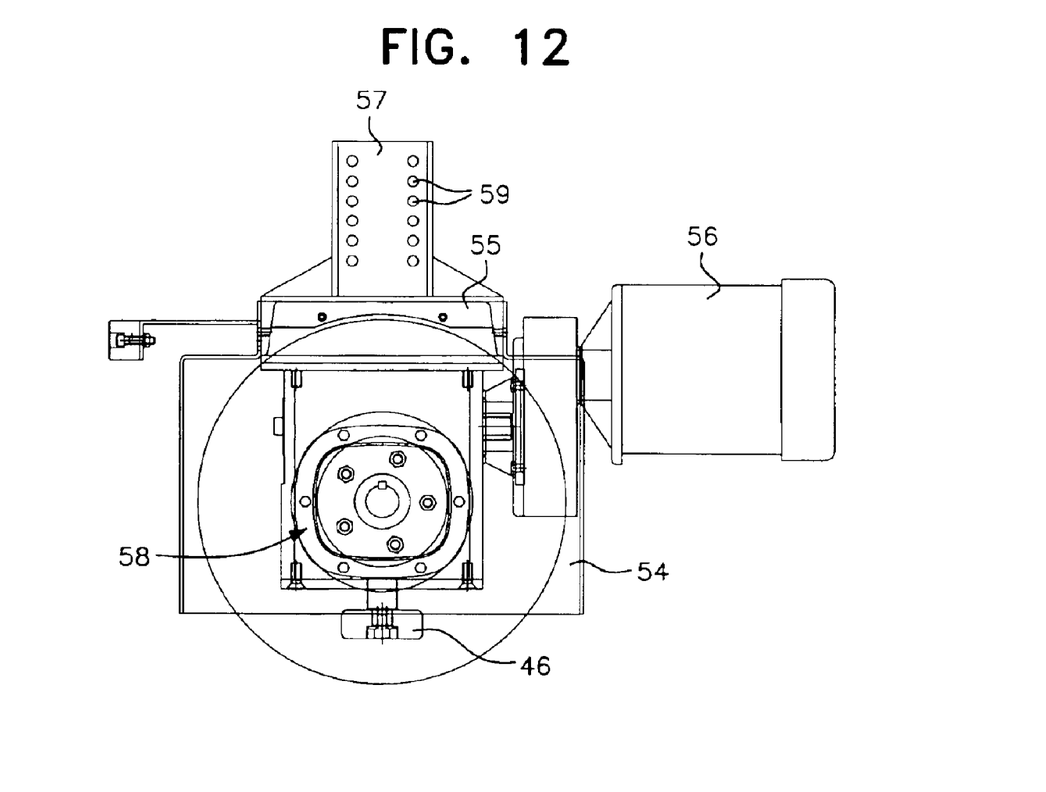
FIG. 12 is a side elevational view of the structure illustrated in FIG. 11.

FIGS. 11 and 12 illustrate additional detail of the drive wheel supporting structure 34 in which a transverse frame member 55 interconnects the wheels 52, axle 53, drive motor 56 and gear box or transmission 58 to form a single rigid unit. The frame member 55 includes a pair of side support brackets 57 which extend upwardly for connection with the frame rails 76 in lower conveyor section 34. The brackets 57 include a series of vertically spaced apertures 59 which adjustably connect the wheel drive unit 58 to the frame 74 of the lower conveyor section 34. This unit forms the driving mechanism for extending and retracting the lower conveyor section 34 in relation to the upper conveyor section 32 and extends the discharge end of the conveyor section 34 into a load body, such as a truck or semi trailer body.

Figure 13:
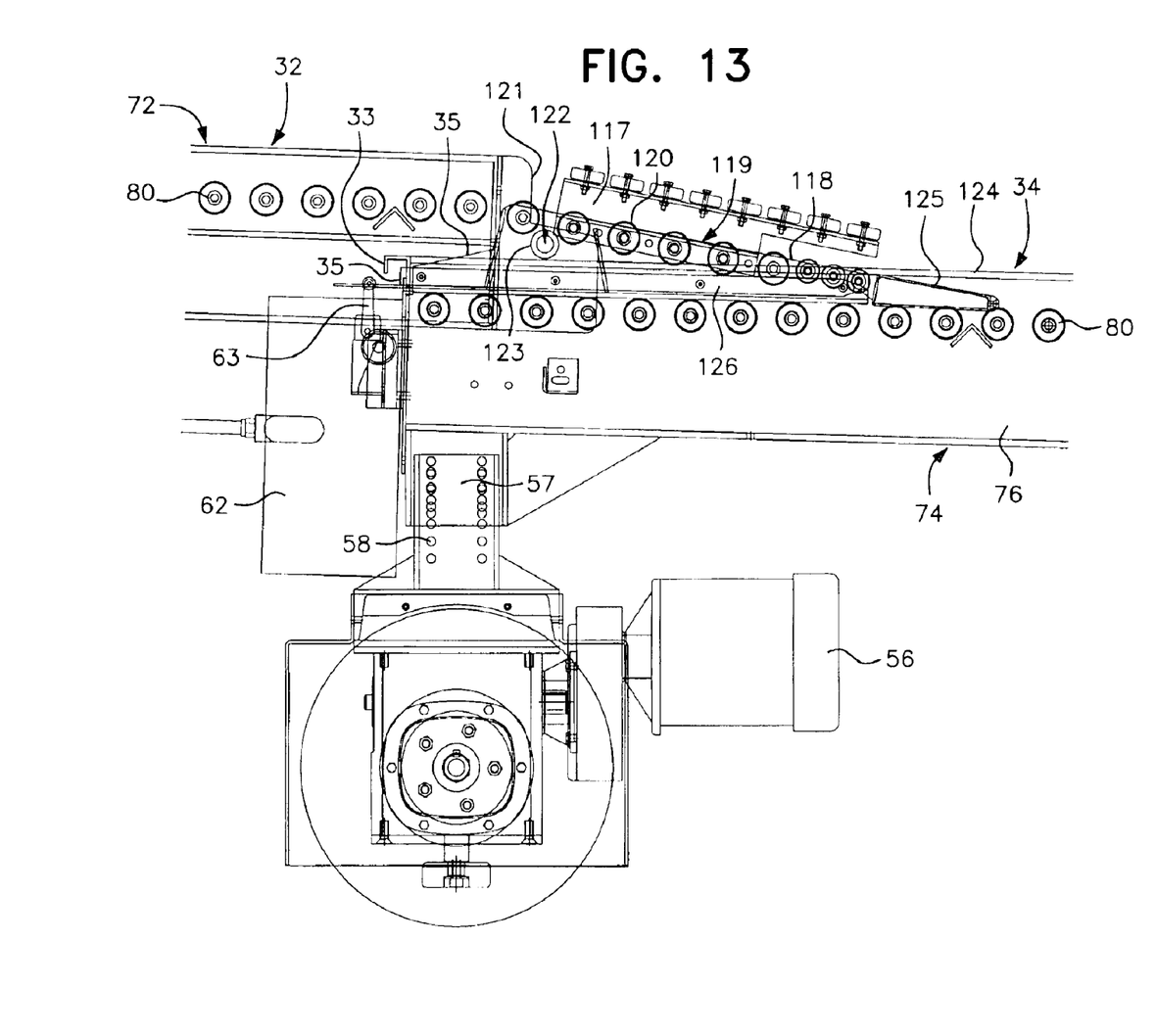
FIG. 13 is a schematic detail view of the association of the discharge end of the upper conveyor section, the infeed end of the lower conveyor section and the transition conveyor section interconnecting the upper and lower conveyor sections of the conveyor of FIG. 1.
Figure 14:
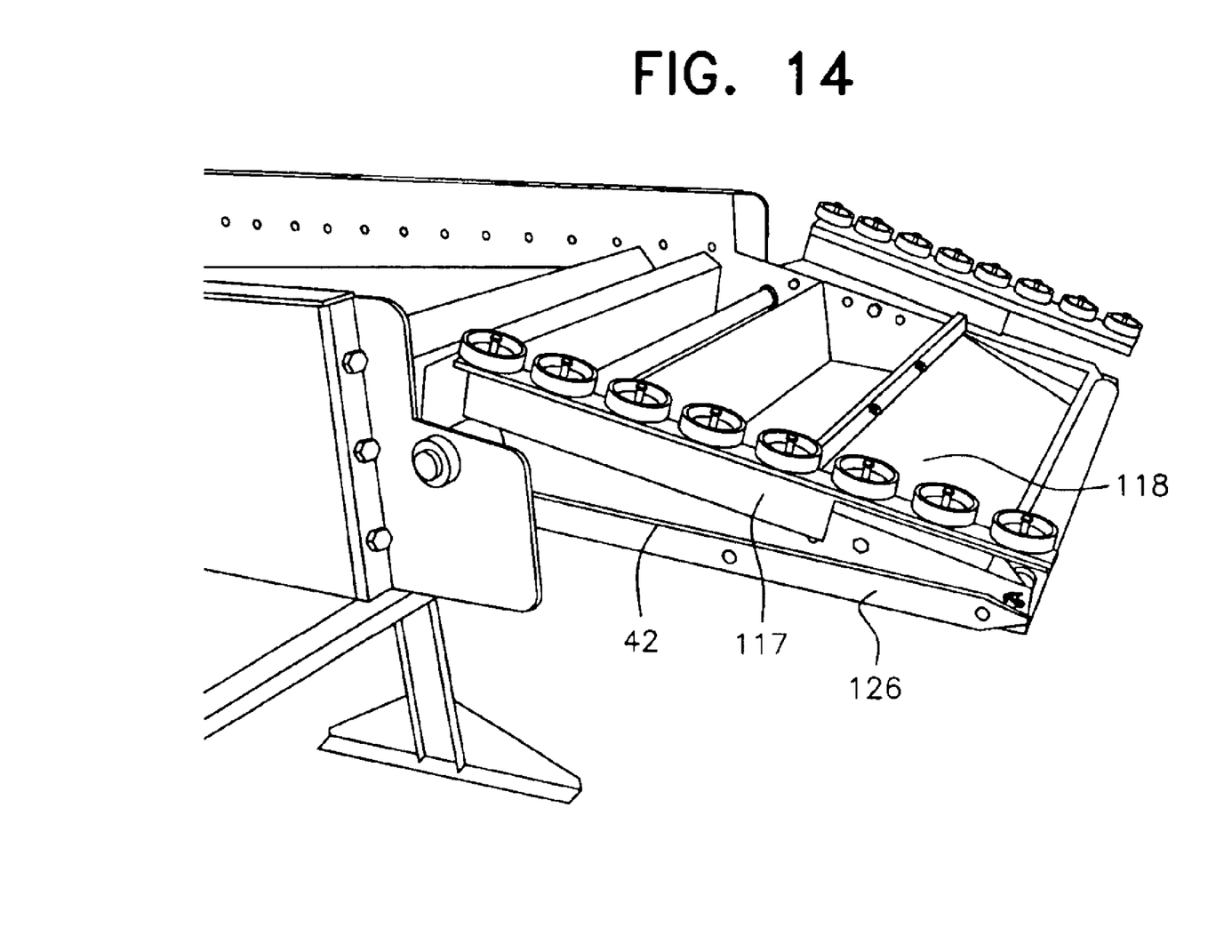
FIG. 14 is a perspective view of the transition conveyor section illustrated in FIG. 13, but without the conveying rollers in place.
Figure 15:
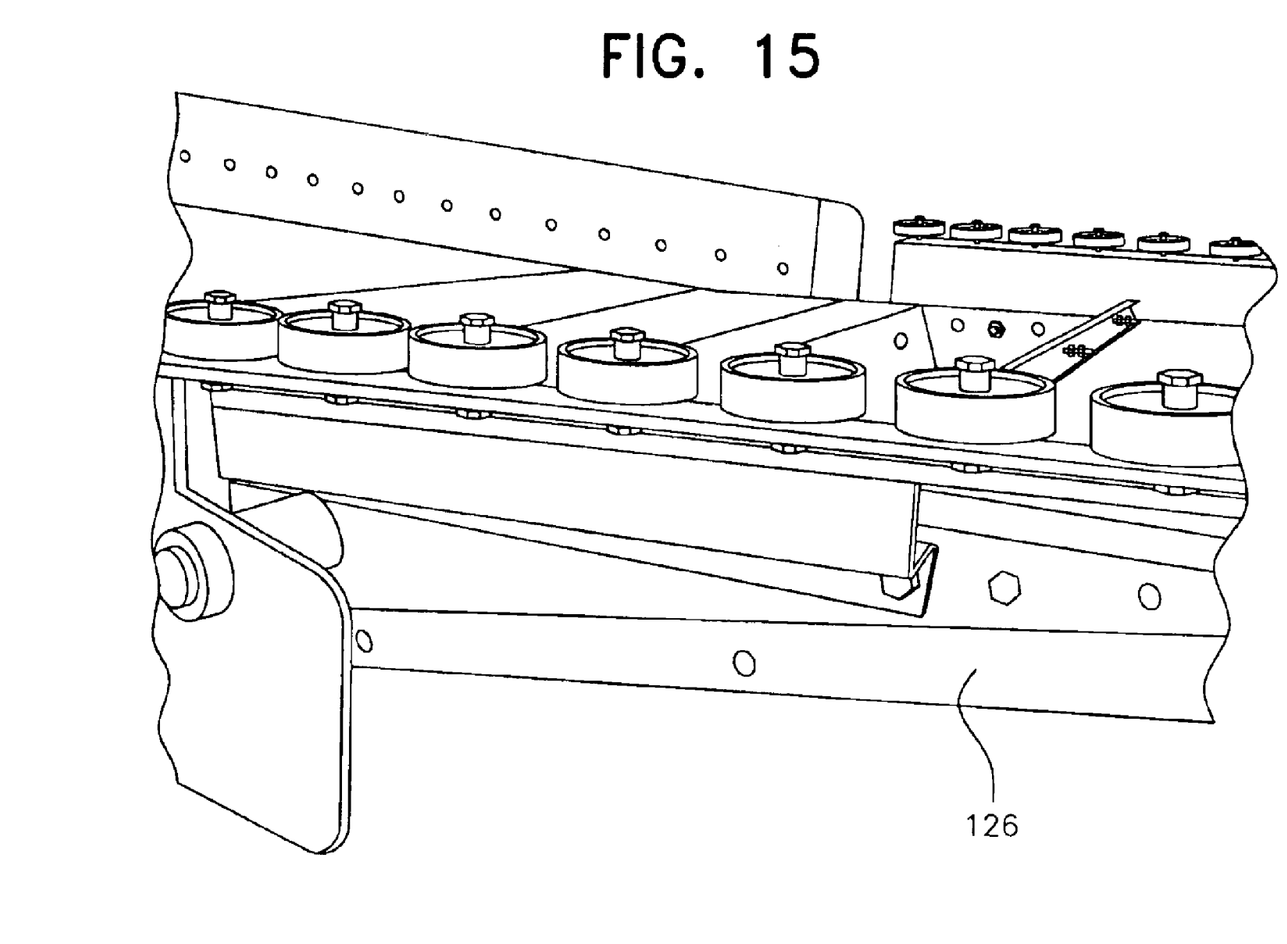
FIG. 15 is a close-up perspective view of the transition conveyor section of FIG. 13, illustrating the guide rollers along each side of the transition conveyor section.
Figure 16:
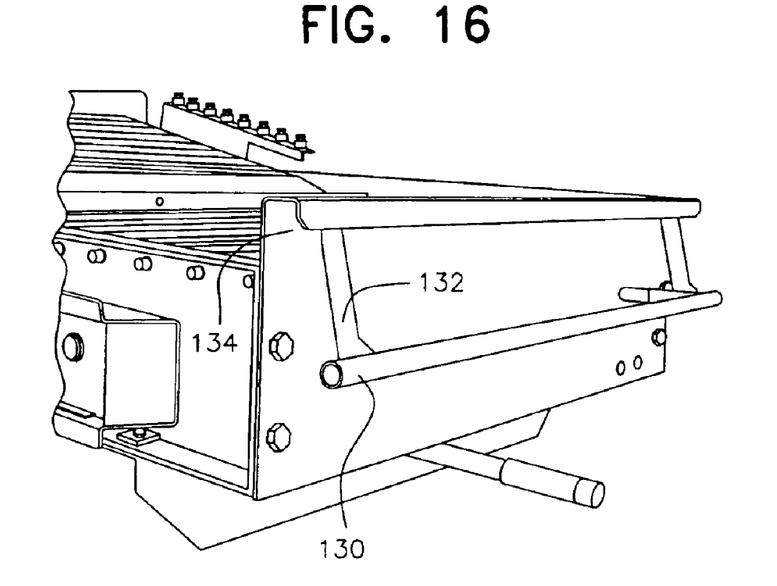
FIG. 16 is a perspective view of the discharge end of the lower conveyor section of the conveyor of FIG. 1, illustrating the control handle for the steering assembly and a safety device limiting the forward movement of the conveyor sections.
Figure 17:
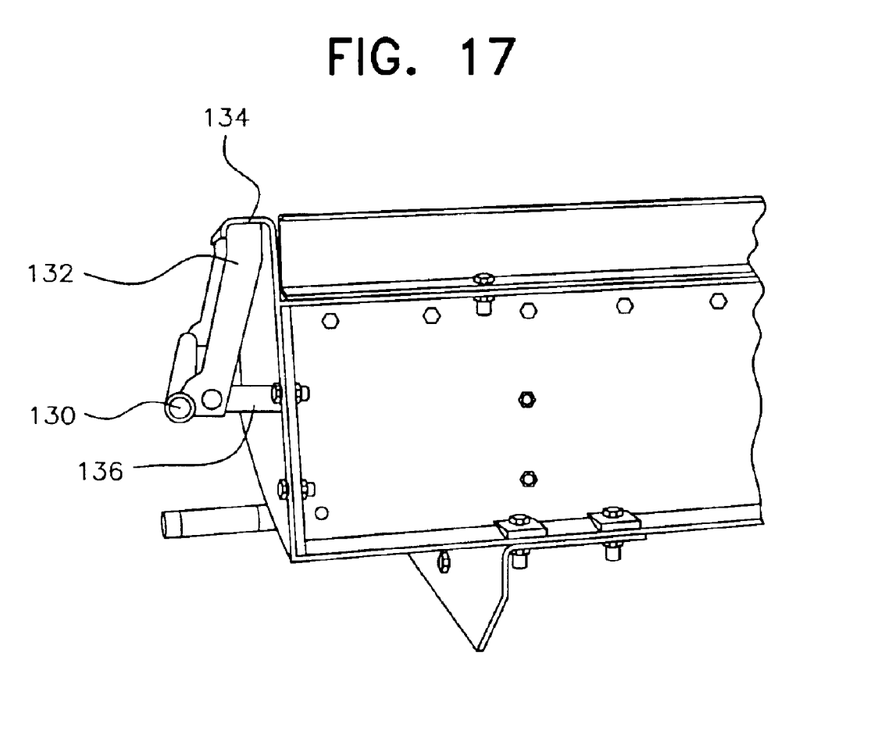
FIG. 17 is a side elevational view of the discharge end of the lower conveyor section of FIG. 16, illustrating further structural details of the safety device which limits forward movement of the conveyor sections.
Figure 18:
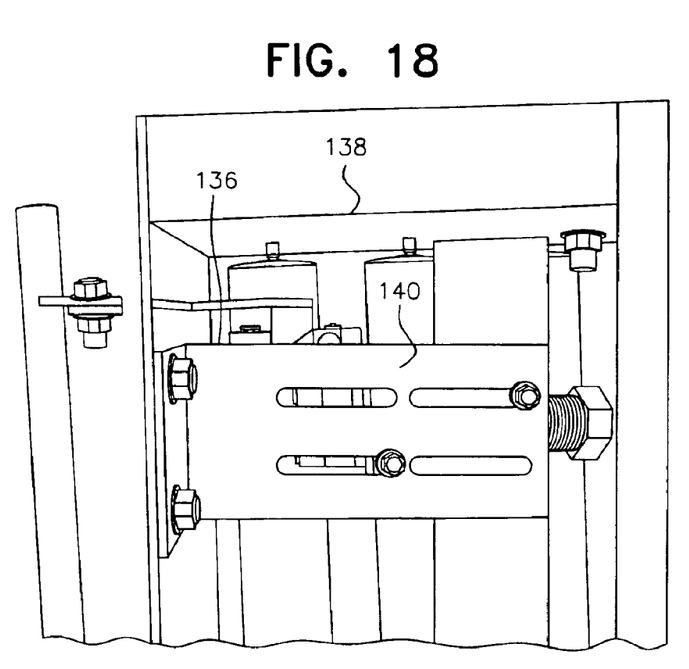
FIG. 18 is a detailed bottom view of the support structure for the limiting switch structure actuated by the movement limiting device in accordance with the present invention.
Figure 19:
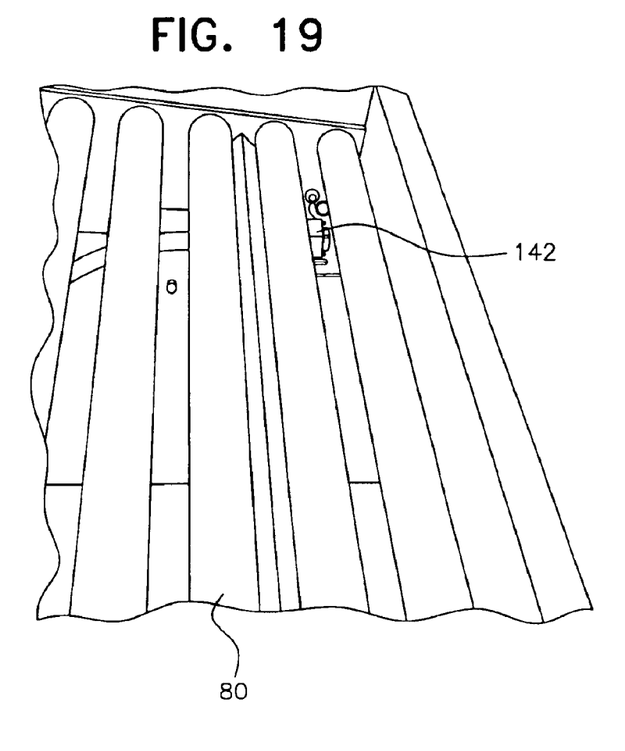
FIG. 19 is a detailed view illustrating the location of the limiting switch of the present invention, which is activated when the operating member for the limiting device engages an obstruction.

FIGS. 13, 14 and 15 illustrate specific structural details of the transition conveyor section 42 which extends between the conveyor sections 32 and 34. The transition conveyor section 42 includes a pair of side members 117 attached to side edges of a transverse plate 118 which is inclined and provided with side frame members 119 which support undriven conveying rollers 120 therebetween. The transition conveyor section 42 declines downwardly from the conveyor section 32 and includes a pair of plates 121 at the end thereof to which the frame 119 is pivotally attached by a shaft 122. Shaft 122 also supports rollers 123 at each end which engage a top flange 124 on both of the frame rails 76 of the lower conveyor section 34. The two rollers 123 are mounted on shaft 122 and rest on upper flange 124 of frame rails 76 of frame 74. The transition conveyor section also includes a tapered ramp 123 at its exit end to provide a smooth transition onto the lower conveyor section 34. The plate 118 of the transition conveyor section 42 also pivots about the pivot shaft 122 to varying heights of the lower conveyor section as it extends and retracts.

The two frames 72 and 74 which form the upper and lower conveyor sections are guided during relative longitudinal movement by two longitudinally extending guide strips 126 of suitable material, such as ultra high molecular weight plastic. The strips 126 are bolted to the outer surfaces of side members 117 of the transition plate 118 as illustrated in FIGS. 13–15. The guides strips 126 are sandwiched between the upper flange of the lower frame 74 and the outer side flanges on frame 72 of the upper conveyor section 32. This sandwich engagement of the flanges on the frame rails of the conveyor sections and the plastic guide strips 126 bolted onto the sides of the transition conveyor plate maintain alignment of the conveyor sections 32 and 34 when they are extended and retracted between the positions illustrated in FIGS. 1 and 2.

FIGS. 16, 17, 18 and 19 illustrate a safety device at the discharge end of the lower conveyor section 34 which disables forward movement of the lower conveyor section 34 when an obstruction is engaged while the conveyor section 34 is being extended. The safety device includes a transverse bumper stop 130 in the form of a transverse bar, pipe or the like positioned in generally parallel relation to an end frame member 79 on lower conveyor section 34. The stop member 130 being welded to a pair of upwardly extending brackets 132 pivotally supported at their upper ends to frame member 79 at 134. The bumper stop 130 includes actuator bars 136 which are pivotally connected to stop 130 and extend through frame 79 to connect with and move a limit switch 138 supported by a slotted guide 140 attached to the inner surface of frame 79. The switch 138 includes an actuator 142 extending between the rollers 80 so that when the actuator 142 engages a roller 80 as the limit switch 138 is moved towards the roller 80, the power to the motor 56 and the drive unit 38 will be terminated thereby preventing injury to personnel that may be positioned between the advancing discharge end of the conveyor section 34. Also, if the bumper bar 130 strikes an obstruction when advancing in the load body, such as previously loaded parcels, the advance of the conveyor section 34 will be stopped thereby preventing damage to a loaded parcel.

FIG. 13 illustrates a hook shaped stop flange 33 on lower conveyor section 34 which engages a reduced area extension 35 on side members 117 on transition conveyor section 42 to prevent the lower conveyor 34 from exiting from the discharge end of conveyor section 32. Also, to prevent the wheeled structure 38 from engaging wheeled structure 36, a limit switch 63 mounted on junction box 62 is activated by the end of lower conveyor section 34 to limit retraction of the lower conveyor section 34. The motor 56 can be controlled by conventional switch structures either on the conveyor or controlled by a remote control unit.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A conveyor for transferring movable items from a supply source into a load carrying body, said conveyor comprising an upper longitudinally elongated conveyor section and a lower longitudinally elongated conveyor section, each of said conveyor sections including a conveying surface from an infeed end to a discharge end, said conveying surface on said upper conveyor section being disposed at an elevation higher than the conveying surface on said lower conveyor surface, said lower conveyor section underlying said upper conveyor section when said conveyor sections are in retracted position, said conveyor sections being movable longitudinally in relation to each other to extend and retract said conveyor sections in relation to each other, a guide structure interconnecting said conveyor sections to retain said conveyor sections generally in alignment during longitudinal movement thereof, said lower conveyor section including a powered, wheeled supporting structure at an infeed end thereof to move said lower conveyor section longitudinally between an extended position to form a continuous conveying surface and a retracted position with the lower conveyor section underlying said upper conveyor section to reduce the length of said conveyor when retracted to about one half of the length of the conveyor when in extended position, said powered wheeled supporting structure enabling the discharge end of said lower conveyor section to be adjusted in relation to a load body.

2. The conveyor as claimed in claim 1 wherein said conveyor includes a transition conveyor section connected to a discharge end of said upper conveyor section and extending between a discharge end of said upper conveyor section and movably engaging an infeed end of said lower conveyor section to provide a continuous conveying surface from an infeed end of said upper conveyor section to a discharge end of said lower conveyor section when said conveyor sections are in extended position.

3. The conveyor as claimed in claim 1 wherein said lower conveyor section includes a steerable support wheeled structure at a discharge end thereof to enable the discharge end of said lower conveyor section to be selectively oriented with respect to a load body to facilitate loading items into selected position in a load body.

4. The conveyor as claimed in claim 1 wherein each of said conveyor sections include a declining conveying surface having a higher infeed end and a lower discharge end with the discharge end of the conveying surface on said upper conveyor section overlying an infeed end of said lower conveyor section, each of said declining conveying surfaces including a plurality of undriven rollers to enable gravity movement of said movable items.

5. The conveyor as claimed in claim 1 wherein said powered wheeled supporting structure includes a motor driving said wheeled structure to extend and retract said lower conveyor section in relation to said upper conveyor section and move both conveyor sections when extended.

6. The conveyor as claimed in claim 2 wherein said lower conveyor section includes a steerable support structure at a discharge end thereof to enable the discharge end of said lower conveyor section to be selectively oriented with respect to a load body to facilitate loading items into selected position in a load body.

7. The conveyor as claimed in claim 5 wherein said upper conveyor section includes a wheeled supporting structure supporting an infeed end thereof to enable movement of said conveyor when in retracted and extended positions.

8. A conveyor comprising an upper longitudinally elongated conveyor section and a lower longitudinally elongated conveyor section, each of said conveyor sections including a conveying surface from an infeed end to a discharge end, said conveying surface on said upper conveyor section being disposed at an elevation higher than the conveying surface on said lower conveyor surface, said lower conveyor section underlying said upper conveyor section when said conveyor sections are in retracted generally coextensive position, said conveyor sections being simultaneously movable longitudinally when in retracted position and being movable longitudinally in relation to each other to extend and retract said conveyor sections in relation to each other, said lower conveyor section including a powered wheeled supporting structure at an infeed end thereof to simultaneously move said conveyor sections longitudinally when in retracted position and move said lower conveyor section longitudinally in an extending relation to the upper conveyor section to form a continuous conveying surface.

9. The conveyor as claimed in claim 8 wherein each of said conveyor sections includes a gradually declining conveying surface having a higher infeed end and a lower discharge end with the discharge end of the conveying surface on said upper conveyor section overlying said lower conveyor section.

10. The conveyor as claimed in claim 8 wherein said powered wheeled supporting structure includes a motor driving said wheeled structure to extend and retract said lower conveyor section in relation to said upper conveyor section.

11. The conveyor as claimed in claim 8 wherein said upper conveyor section includes a wheeled supporting structure supporting an infeed end thereof, a guide member depending from an infeed end of said upper conveyor section, a stationary guide track engaged by said guide member to guide movement of the infeed end of said upper conveyor section when being extended and retracted, said track and guide member being engaged during all movement of said conveyor sections.

12. A conveyor comprising an upper elongated conveyor section, a lower elongated conveyor section, said conveyor sections being longitudinally extendable and retractable in relation to each other, a stationary guide track underlying said upper conveyed section, said upper conveyor section including a wheeled support and a guide member engaged with said guide track to guide the infeed end of said upper conveyor section, said lower conveyor section including a powered wheeled support structure at an infeed end thereof to move said lower conveyor section in relation to said upper conveyor section, said lower conveyor section including a steerable wheeled support at a discharge end thereof to directionally control movement of the discharge end of said lower conveyor section.

13. The conveyor as claimed in claim 12 wherein said guide track and guide member enable said upper conveyor section to pivot about a generally vertical axis defined by said guide member as the discharge end of said lower conveyor section is being directionally controlled.

14. The conveyor as claimed in claim 12 wherein said steerable support structure includes a forwardly extending tongue to enable manual steering control of the discharge end of said lower conveyor section.

15. The conveyor as claimed in claim 14 wherein said discharge end of said lower conveyor section includes a locking device to lock said tongue in adjusted position.

16. The conveyor as claimed in claim 8 wherein said lower conveyor section includes a safety device to disable said powered wheeled supporting structure when the discharge end of said lower conveyor section contacts an obstruction in the path of movement thereof.

* * * * *